July 25, 1967 W. T. TOMLIN 3,333,120
PULSE FORMING NETWORK VOLTAGE REGULATOR
Filed Nov. 10, 1964
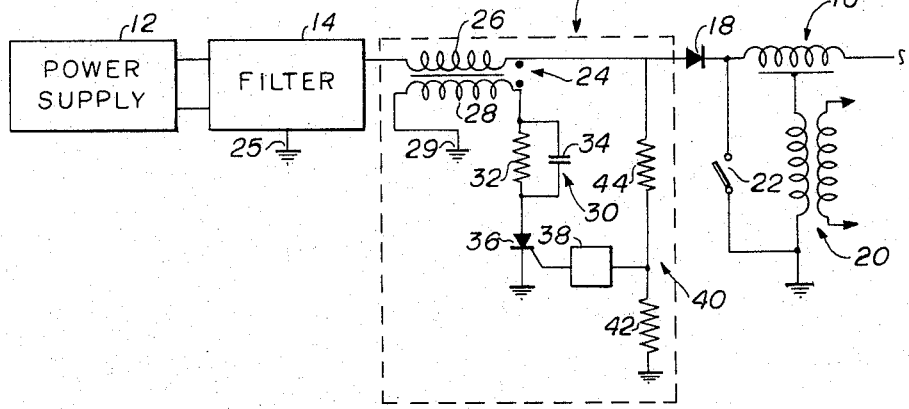
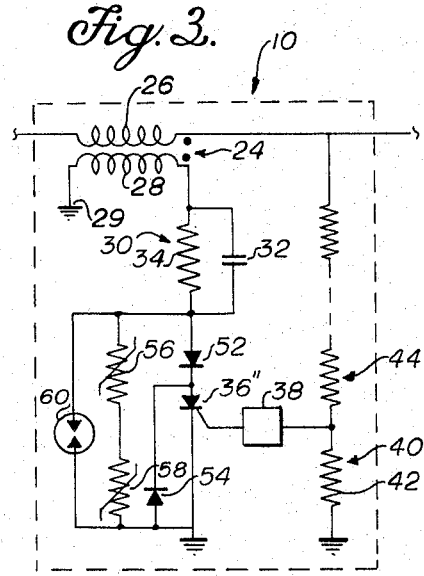
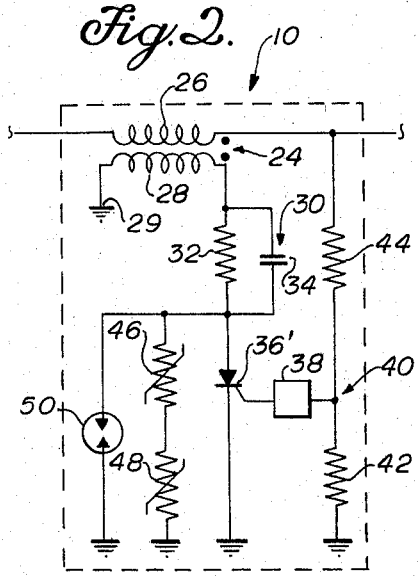
INVENTOR.
WILLIAM T. TOMLIN
BY
ATTORNEY

United States Patent Office 3,333,120
Patented July 25, 1967

3,333,120
PULSE FORMING NETWORK VOLTAGE
REGULATOR
William T. Tomlin, Mountain View, Calif., assignor to the United States of America as represented by the United States Atomic Energy Commission
Filed Nov. 10, 1964, Ser. No. 410,335
7 Claims. (Cl. 307—106)

The present invention relates generally to voltage regulators and particularly to a voltage regulator for regulating the voltage of pulse-forming networks in line-type pulse modulators.

There are various circuits which can be utilized for regulating the charging voltage of a pulse forming network. For example, there are circuits employing the concept of firing a high voltage thyratron in series with a resistor, wherein both of the elements are in parallel with a charging inductor. In such circuits the life of the thyratron is shortened since the tube must withstand a large negative potential when the main switch tube fires. At fast repetition rates the voltage reversal occurs while the thyratron is still conducting forward current and the tube does not deionize. Thus the regulation takes place at a high voltage. There are other circuits which utilize configurations similar to that described above, wherein, however, a high voltage thyratron operates in association with diodes and resistors in order to monitor and direct a portion of the energy of the charging choke back into the filter condenser. As in the first mentioned circuit, the latter circuit regulates the voltage of the pulse-forming network by operating at higher voltages. Again the direct result is a reduction in the length of thyratron tube life. Both the above circuits furthermore, are relatively complicated in design and operation.

The present invention overcomes the above-noted shortcomings by providing a simple, efficient, and stable circuit capable of regulating the voltage of a pulse-forming network utilized, i.e., in the operation of extremely high-powered klystron tubes. In addition, the invention eliminates the problem associated with prior art devices regarding the relatively short life of the switch tubes, while eliminating the necessity of regulation at high voltages.

Accordingly, it is an object of the present invention to provide a circuit capable of regulating the voltage of a pulse-forming network utilized in conjunction with high-energy klystron tubes.

It is another object of the present invention to provide a simple, efficient, and stable circuit for use in regulating voltages.

It is still another object of the present invention to provide a voltage regulating circuit which operates at low voltage levels.

Yet another object of the present invention is to provide a voltage regulator which utilizes a simple trigger circuitry requiring only a fraction of a watt of power for initiation of operation.

Other objects and advantages will be apparent in the following description and claims considered together with the accompanying drawing, in which:

FIGURE 1 is a schematic diagram of one embodiment of the present invention utilized in conjunction with a pulse-forming network.

FIGURES 2 and 3 are schematic diagrams of alternative embodiments of the invention exemplifying further refinements of the basic concept thereof.

Referring to FIGURE 1, there is shown a voltage regulator 10 of the invention utilized in conjunction with a line-type pulse modulator. The pulse modulator, shown herein to exemplify the operation of the invention, comprises the conventional combination of a power supply 12, a filter circuit 14, a pulse-forming network 16 (hereinafter abbreviated PFN for simplicity), and a charging diode 18. The PFN 16 is discharged through a pulse output transformer 20 and into a load (not shown) via a suitable main switch means 22 such as, for example, a thyratron tube. Charging of the PFN 16 is accomplished via a charging transformer 24 connected between the PFN and the power supply 22. One output terminal of filter 14 is connected to ground at 25.

Transformer 24 comprises a primary winding 26 serially connected between another output terminal of filter 14 and an anode terminal of the charging diode 18, and a secondary winding 28 which is connected at one end to ground at 29 and at the other end to a loading circuit 30. Loading circuit 30 satisfactorily utilizes the combination of a loading resistor 32 connected in parallel with a loading capacitor 34. A silicon controlled rectifier 36, hereinafter termed SCR 36, having an anode, cathode, and trigger electrode, is connected at the anode terminal thereof to the loading circuit 30. The cathode terminal of SCR 36, is in turn, connected to ground.

A low level trigger circuit 38 having input and output terminals, is connected to the trigger electrode of SCR 36 at the output end thereof, and the input is connected to a reference voltage divider 40. The reference voltage divider 40 utilizes, for example, a resistor 42 connected at one end to ground and at the other end to the input side of trigger circuit 38. Another resistor 44 is connected at one end to the junction between resistor 42 and the trigger circuit input, and the opposite side of resistor 44 is connected to the charging diode side of the transformer primary 26, to complete the circuitry of the voltage divider 40.

During the charging cycle, the current passing through the primary winding 26 of charging transformer 24 is a function of $I_{max} \sin \omega t$, and the voltage across the primary is $E_{dc} \cos \omega t$, where $E_{dc}$ is the energizing potential. Transformer 24 is chosen to provide a stepdown ratio of approximately 25 to 1 wherein however other ratios, such as for example 50 to 1, are also feasible. Additionally, the transformer windings 26, 28 are connected such that the waveform applied on the SCR side of the secondary winding 28 is in phase with the waveform at the charging diode side of the primary windings 26, as herein indicated by the polarity dots in the figures. The transformer 24 is preferably a low leakage inductance type of transformer, having for example, a leakage inductance of 40 microhenries referred to the low voltage, i.e., secondary, winding.

In operation the SCR 36 is fired by means of the trigger circuit 38 and reference voltage divider 40 at a desired point of time as the regulating voltage wave progresses during the charging cycle of PFN 16.

Triggering of SCR 36 connects the loading circuit 30, and particularly, capacitor 34 and resistor 32, across the transformer secondary winding 28. Such action in effect creates a direct short between the primary and secondary windings 26, 28 respectively of transformer 24, since capacitor 34 is essentially discharged when such triggering takes place. As a result, energy is transferred from the primary 26 to the secondary 28 of the transformer 24 resulting in a reduction of the voltage drop across the transformer primary 26.

A slight drop in the voltage existing across the transformer primary 26 during the charging cycle forces the anode of the charging diode 18 to a negative value with respect to the cathode thereof. Thus the diode 18 ceases to conduct. At this point the charging of the PFN capacitors stops and the charging voltage thereacross is held constant at the desired value by the voltage regulator 10 of the invention, as intended.

Operating parameters of the invention, offered by way of example only, are as follows. For an input voltage, to the primary 26, of 20 kilovolts, there exists a charging voltage of 0 to 40 kilovolts across the PFN 16 during the charging cycle. The voltage across the secondary 28 thus varies from 800 volts negative to 800 volts positive for a transformer having a primary-to-secondary ratio of 25 to 1. The loading resistor 32 has a value of 2 ohms, and the loading capacitor 34 has a value of 50 microfarads. It is to be noted that the SCR 36 could be replaced with other electrical switch devices, such as for example, an ignition tube.

Referring now to FIGURE 2 there is shown a modification of the circuit of FIGURE 1 exemplifying refinements to the basic circuit. Such refinements may be made to the circuit to prevent the occurrence of excessive negative voltages across the SCR 36, and thus protect the SCR from possible failure due to such negative voltages. For example, to reduce the negative voltages, and in particular negative voltage transients, which could possibly appear across a SCR 36', first and second thyrite resistors 46, 48 respectively, are serially connected from the anode side of the SCR 36' and from thence to ground, to appear thus in electrical parallel with the SCR. A spark-gap 50 is connected in parallel with both the thyrite resistors 46, 48 and the SCR 36' and particularly from the anode of SCR 36' to ground. The spark-gap 50 may be added to the circuits as desired, and acts as an added safety feature to further protect the SCR 36' from excessive negative voltage.

Referring to FIGURE 3 there is shown a further modification of the circuit of FIGURE 1. More particularly, a series diode 52, having an anode and cathode electrode, is serially connected at the anode thereof to the loading circuit 30, and at the cathode thereof to the anode of a SCR 36''. To preclude the appearance of any negative voltage across the SCR 36'', a reverse shunt diode 54, having an anode and cathode electrode, is connected at the cathode thereof to the anode of the SCR 36'', and at the anode thereof to ground, to thus appear in electrical parallel across the SCR 36''. The reverse shunt diode 54 thus prevents any negative voltage from appearing across the SCR 36''. However, negative voltage will appear across the series diode 52. Accordingly, to protect the series diode 52 from excessive negative voltages, first and second thyrite resistors 56, 58 respectively, are connected in parallel from the anode of the series diode 52 to ground. Additionally, a spark-gap 60 is connected in parallel with both the resistors 56, 58 and particularly from the anode of diode 52 to ground. The thyrite resistors 56, 58 tend to diminish the negative voltage transients which could possibly appear across the series diode 52, while the spark-gap 60 is a safety feature which may be added to further protect the diode 52 or the SCR 36''.

While there has been described in the foregoing what may be considered to be preferred embodiments of the invention modifications may be made therein without departing from the concept and teachings of the invention and it is intended to cover all such that fall within the scope of the appended claims.

What is claimed is:

1. A voltage regulator for regulating the voltage applied to a pulse-forming network of a line-type pulse modulator comprising (a) charging inductor means including a primary winding and a secondary winding, said primary winding being serially connected in the charging line to said pulse-forming network, said secondary winding having one end connected to ground;

(b) loading circuit means connected at one end thereof to the free end of said secondary winding;

(c) electrical switch means including a trigger element connected to the free end of said loading circuit and from thence to ground;

(d) and potential sensing and trigger means connected between the trigger element of said switch means and the charging line to said pulse forming network to initiate energization of said switch means in response to a predetermined level of voltage sensed thereby.

2. The voltage regulator in accordance with claim 1 wherein said loading circuit means comprises a capacitor and a resistor connected in electrical parallel.

3. The voltage regulator in accordance with claim 2 wherein said switch means comprises a silicon controlled rectifier having an anode a cathode and a trigger element, connected at its anode to said loading circuit means and connected at the cathode to ground, the trigger element thereof being coupled to said potential sensing and trigger means.

4. The voltage regulator in accordance with claim 3 wherein said potential sensing and trigger means further includes a voltage divider connected between the input to said pulse forming network and ground, and a trigger circuit connected at its input to the output of said voltage divider, wherein said voltage divider introduces a signal to the trigger circuit upon sensing a predetermined charging voltage level, and said trigger circuit in turn triggers said switch means.

5. The voltage regulator in accordance with claim 1 further comprising, a thyrite resistance connected from the junction connecting said switch means to said loading circuit means and from thence to ground, and a spark-gap connected in electrical parallel across said thyrite resistance.

6. The voltage regulator in accordance with claim 1 further comprising, a series diode having an anode and cathode electrode serially connected between said loading circuit means and said switch means, the anode thereof being connected to said loading circuit means, a reverse shunt diode having an anode and cathode connected in electrical parallel across said switch means, the cathode thereof being connected to the junction of said series diode and said switch means, a thyrite resistance connected in electrical parallel across said series diode and said reverse shunt diode, and a spark-gap connected in electrical parallel across said thyrite resistance.

7. A voltage regulator for regulating the voltage applied to the pulse-forming network of a line-type pulse modulator via a charging diode comprising (a) a charging transformer having a primary and a secondary, the primary being serially connected within the charging line before said charging diode of the pulse modulator, the secondary having one side thereof connected to the ground;

(b) a resistor and a capacitor connected in electrical parallel and connected at one end thereof to the other side of the secondary;

(c) a diode having an anode and a cathode connected at the anode thereof to the opposite end of said parallel resistor and capacitor;

(d) a silicon controlled rectifier having an anode, cathode, and a trigger element, connected at the anode to the cathode of said diode, and at the cathode thereof to ground;

(e) a protective circuit including a thyrite resistance connected in electrical parallel across said diode and said silicon controlled rectifier and a spark-gap connected in electrical parallel across said protective circuit;

(f) a reference voltage divider including a first resistance connected at one end to the charging diode side of said primary winding, a second resistance connected to ground at one side and connected at a common junction with said first resistance;

(g) and trigger circuit means connected at its input to the common junction of said reference voltage divider resistances and at its output to the trigger element of said silicon controlled rectifier, whereby said silicon controlled rectifier is energized via said reference voltage divider at a predetermined point of time during the rise of the charging voltage whereupon said loading capacitor is discharged through said secondary of the transformer.

References Cited

UNITED STATES PATENTS

| | | | |
|---|---|---|---|
| 2,700,121 | 1/1955 | Germeshausen | 315—180 |
| 2,827,575 | 3/1958 | Smith et al. | 307—106 |
| 2,906,895 | 9/1959 | Thomas | 307—106 |
| 3,046,419 | 7/1962 | Raber | 307—106 |
| 3,149,245 | 9/1964 | Barnes et al. | 307—106 |

JOHN F. COUCH, *Primary Examiner.*

W. E. RAY, *Assistant Examiner.*